United States Patent
Chen et al.

(10) Patent No.: US 8,832,838 B2
(45) Date of Patent: Sep. 9, 2014

(54) COMPUTER WORM CURING SYSTEM AND METHOD AND COMPUTER READABLE STORAGE MEDIUM FOR STORING COMPUTER WORM CURING METHOD

(75) Inventors: Shih-Jen Chen, Tucheng (TW); Jain-Shing Wu, Taipei (TW); Fu-Hau Hsu, Taichung (TW); Chia-Jun Lin, Zhubei (TW)

(73) Assignee: Institute for Information Industry, Taipei (TW)

( * ) Notice: Subject to any disclaimer, the term of this patent is extended or adjusted under 35 U.S.C. 154(b) by 945 days.

(21) Appl. No.: 12/961,605

(22) Filed: Dec. 7, 2010

(65) Prior Publication Data

US 2012/0117647 A1    May 10, 2012

(30) Foreign Application Priority Data

Nov. 4, 2010    (TW) .............................. 99137968 A

(51) Int. Cl.
*H04L 21/00* (2006.01)
*G06F 21/56* (2013.01)

(52) U.S. Cl.
CPC .................................. *G06F 21/568* (2013.01)
USPC ....................................................... 726/25

(58) Field of Classification Search
CPC ....... G06F 21/00; G06F 21/56; G06F 21/554; G06F 21/55; G06F 21/577; G06F 21/564; H04L 63/145; H04L 63/1416; H04L 63/1433
USPC ....................................................... 726/25
See application file for complete search history.

(56) References Cited

U.S. PATENT DOCUMENTS

| 7,650,640 | B1 * | 1/2010 | Levy ................................ 726/24 |
| 8,051,479 | B1 * | 11/2011 | Bu et al. .......................... 726/22 |
| 2003/0033542 | A1 * | 2/2003 | Goseva-Popstojanova et al. ............................. 713/201 |
| 2004/0255163 | A1 * | 12/2004 | Swimmer et al. ............. 713/201 |
| 2007/0107057 | A1 * | 5/2007 | Chander et al. ................. 726/22 |

(Continued)

FOREIGN PATENT DOCUMENTS

| CN | 101800754 A | 8/2010 |
| TW | 200529621 | 9/2005 |

OTHER PUBLICATIONS

English translation of abstract of CN 101800754 A (published Aug. 11, 2010).

(Continued)

*Primary Examiner* — Lisa Lewis
(74) *Attorney, Agent, or Firm* — McClure, Qualey & Rodack, LLP

(57) ABSTRACT

A computer worm curing system includes a string receiving module, a string generating module and a string replying module. The string receiving module receives an infected string, which is generated by a computer worm, from an infected host, which is infected by the computer worm, through a network. The infected string includes a shellcode, and the shellcode is executed utilizing a vulnerable process. The string generating module generates a curing code for curing the computer worm, and replaces the shellcode in the infected string with the curing code to generate a curing string, such that the curing string can be executed utilizing the vulnerable process. The string replying module replies the curing string to the infected host, such that the curing code of the curing string can be executed utilizing the vulnerable process of the infected host to cure the infected host of the computer worm.

12 Claims, 3 Drawing Sheets

(56) References Cited

U.S. PATENT DOCUMENTS

| | | | |
|---|---|---|---|
| 2009/0292984 A1* | 11/2009 | Bauchot et al. | 715/234 |
| 2009/0300764 A1* | 12/2009 | Freeman | 726/24 |
| 2010/0306851 A1* | 12/2010 | Zhou | 726/25 |

OTHER PUBLICATIONS

English translation of abstract of TW 200529621 (published Sep. 1, 2005).

* cited by examiner

COMPUTER WORM CURING SYSTEM AND METHOD AND COMPUTER READABLE STORAGE MEDIUM FOR STORING COMPUTER WORM CURING METHOD

RELATED APPLICATIONS

This application claims priority to Taiwan Application Serial Number 099137968, filed Nov. 4, 2010, which is herein incorporated by reference.

BACKGROUND

1. Technical Field

The present invention relates to computer worm curing system and method and computer readable storage medium for storing computer worm curing method.

2. Description of Related Art

A computer worm is a self-replicating malware computer program. It uses a computer network to send copies of itself to other nodes (computers on the network) and it may do so without any user intervention. This is due to security shortcomings on the target computer. Unlike a virus, it does not need to attach itself to an existing program. Worms almost always cause at least some harm to the network, if only by consuming bandwidth, whereas viruses almost always corrupt or modify files on a targeted computer.

Worms spread by exploiting vulnerabilities in operating systems. Vendors with security problems supply regular security updates, and if these are installed to a machine then the majority of worms are unable to spread to it. If a vulnerability is disclosed before the security patch released by the vendor, a Zero-day attack is possible.

However, in the prior art, only computer worms at local hosts can be cured, which can't reduce control spread of computer worms.

SUMMARY

According to one embodiment of this invention, a computer worm curing system is provided. When the computer worm curing system receives an infected string from an infected host, which is infected by a computer worm, the computer worm curing system changes the infected string into a curing string and replies the curing string to the infected host for curing. The computer worm curing system includes a string receiving module, a string generating module and a string replying module. The string receiving module receives an infected string, which is generated by a computer worm, from an infected host, which is infected by the computer worm, through a network. The infected string includes a shellcode, and the shellcode is executed utilizing a vulnerable process. The string generating module generates a curing code for curing the computer worm, and replaces the shellcode in the infected string with the curing code to generate a curing string, such that the curing string can be executed utilizing the vulnerable process. The string replying module replies the curing string to the infected host, such that the curing code of the curing string can be executed utilizing the vulnerable process of the infected host to cure the infected host of the computer worm.

According to another embodiment of this invention, a computer worm curing method is provided. In the computer worm curing method, when an infected string is received from an infected host, which is infected by a computer worm, the infected string is changed into a curing string and the curing string is replied to the infected host for curing. The computer worm curing method may take the form of a computer program product stored on a computer-readable storage medium having computer-readable instructions embodied in the medium. The computer worm curing method includes the following steps: an infected string, which is generated by a computer worm, is received from an infected host, which is infected by the computer worm, through a network. Wherein, the infected string includes a shellcode, the shellcode is executed utilizing a vulnerable process. A curing code for curing the computer worm is generated. The shellcode in the infected string is replaced with the curing code to generate a curing string, such that the curing string can be executed utilizing the vulnerable process. The curing string is replied to the infected host, such that the curing code of the curing string can be executed utilizing the vulnerable process of the infected host to cure the infected host of the computer worm.

Above all, the infected host, which transmits the infected string, can be cured. Besides, the infected host can be utilized to cure other infected hosts after cured. In addition, the infected host would not be cured repeatedly, which can save resources for curing computer worms. Computer worms, which utilize the same vulnerable process, can be cured by one curing string. Since less curing strings may be needed for curing computer worms, bandwidth for transmitting curing strings can be reduced and resources to execute curing strings for cure can be saved.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
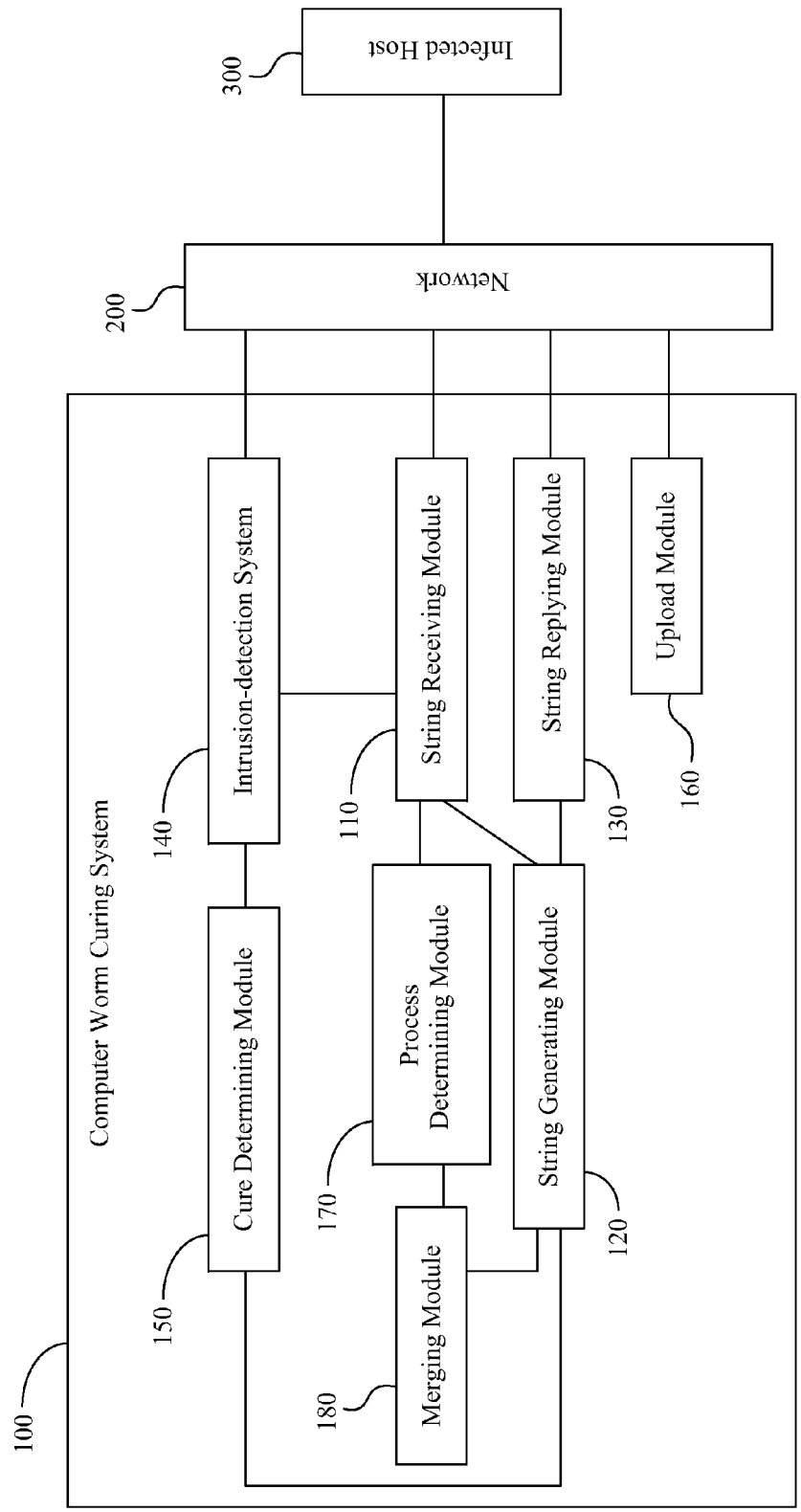
FIG. 1 illustrates a block diagram of a computer worm curing system according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a block diagram of a computer worm curing system according to one embodiment of this invention. When the computer worm curing system receives an infected string from an infected host, which is infected by a computer worm, the computer worm curing system changes the infected string into a curing string and replies the curing string to the infected host for curing.

The computer worm curing system 100 includes a string receiving module 110, a string generating module 120 and a string replying module 130. The string receiving module 120 receives an infected string, which is generated by a computer worm, from an infected host 300, which is infected by the computer worm, through a network 200. The infected string includes a shellcode, and the shellcode is executed utilizing a vulnerable process. The computer worm curing system 100 may detect if a network string received through the network 200 is infected. Therefore, the computer worm curing system 100 may further include an Intrusion-detection system 140. When a network string is received through the network 200, the Intrusion-detection system 140 determines if a network string matches a computer worm characteristic. If the network string does match a computer worm characteristic, the Intrusion-detection system 140 determines that the network string is infected and takes the network string as an infected string for the string receiving module 110 to receive. The Intrusion-detection system 140 may compare the network string with a computer worm characteristic database for intrusion detection. In other embodiments, the Intrusion-detection system 140 may utilize other intrusion detection methods, which should not be limited in this disclosure.

The string generating module 120 generates a curing code for curing the computer worm. The string generating module 120 replaces the shellcode in the infected string with the curing code to generate a curing string. Wherein, the Intrusion-detection system 140 may detect the position of the shellcode in the infected string. Hence, the string generating module 120 replaces the code at the position of the shellcode in the infected string with the curing code to generate the curing string. Then, after the replacement, the curing code of the curing string can be executed utilizing the vulnerable process, which is utilized by the shellcode of the infected string for infection, by the infected host 300. Since the infected host 300 is infected by the shellcode of the infected string through the vulnerable process, the curing code can utilize the vulnerable process thereof to cure the infected host 300.

The string replying module 130 replies the curing string to the infected host 300. Then, the curing code of the curing string can be executed utilizing the vulnerable process of the infected host 300 to cure the infected host 300 of the computer worm. In one embodiment, the curing code may make the infected host 300 withdraw received strings infected by the same computer worm. In another embodiment, the curing code may make the infected host 300 withdraw strings to be uploaded, which is infected by the same computer worm. In other embodiments, the curing code may utilize other cure methods to cure the infected host of the computer worm, which should not be limited in this disclosure. Therefore, the computer worm curing system 100 would not be infected. Furthermore, the infected host 300, which transmits the infected string, can be cured.

In addition, the infected host 300 can be utilized as another computer worm curing system. Hence, the computer worm curing system 100 may further include an upload module 160. The upload module 160 uploads a module establishing packet, which includes codes of the string generating module 120 and the string replying module 130, to the infected host 300. When the codes of the string generating module 120 and the string replying module 130 in the module establishing packet is executed, the infected host 300 establishes another string generating module and another string replying module. Therefore, the infected host 300 can be another computer worm curing system to cure other hosts infected by the computer worm.

The curing code may make the infected host 300 transmit a download request to request the computer worm curing system 100 for the module establishing packet. Hence, the curing code may include a download instruction, which makes the infected host 300 transmit a download request to the computer worm curing system 100. When the infected host 300 executes the download instruction in the curing code through the vulnerable process, the infected host 300 transmits a download request to computer worm curing system 100. When the computer worm curing system 100 receives the download request, the upload module 160 of the computer worm curing system 100 is triggered to upload the module establishing packet to the infected host 300. Therefore, the infected host 300 can not only be cured but also cure other infected hosts.

In addition, the vulnerable process utilized by the curing code of the curing string and that utilized by the shellcode of the infected string are the same. The Intrusion-detection system 140 may take the curing string as the infected string and cure the hosts again. Hence, the computer worm curing system 100 may further include a cure determining module 150. When the Intrusion-detection system 140 determines that the network string, which is received from the infected host 300 through the network 200, matches a computer worm characteristic, the cure determining module 150 determines if the network string includes the curing code. If the network string does include the curing code, the cure determining module 150 determines that the infected host 300, which transmits the network string with the curing code, is cured without making the string generating module generate the curing code. Therefore, the infected host 300 would not be cured repeatedly, which can save resources for curing computer worms.

In addition, curing codes, which utilize the same vulnerable process to cure different computer worms, can be merged into one curing string. Therefore, the computer worm curing system 100 may include a process determining module 170 and a merging module 180. When the string receiving module 110 receives a second infected string, which is infected by a second computer worm, the process determining module 170 determines if a second vulnerable process, which is utilized by the second shellcode of the second received infected string, is the same with the vulnerable process utilized previously. Wherein the second received infected string is generated by the second computer worm, and the string generating module 130 generates a second curing code to cure the second computer worm. If the second vulnerable process is the same with the vulnerable process utilized previously, the merging module 180 merges the curing code and the second curing code to generate a merged code. The string generating module 120 replaces the second shellcode of the second infected string with the merged code to generate a merged curing string. Then, the string replying module 130 replies the merged curing string to the infected host 300 to cure several computer worms, which utilize the same vulnerable process. Therefore, computer worms, which utilize the same vulnerable process, can be cured by one curing string. Since less curing strings may be needed for curing computer worms, bandwidth for transmitting curing strings can be reduced and resources to execute curing strings for cure can be saved.

Figure 2:
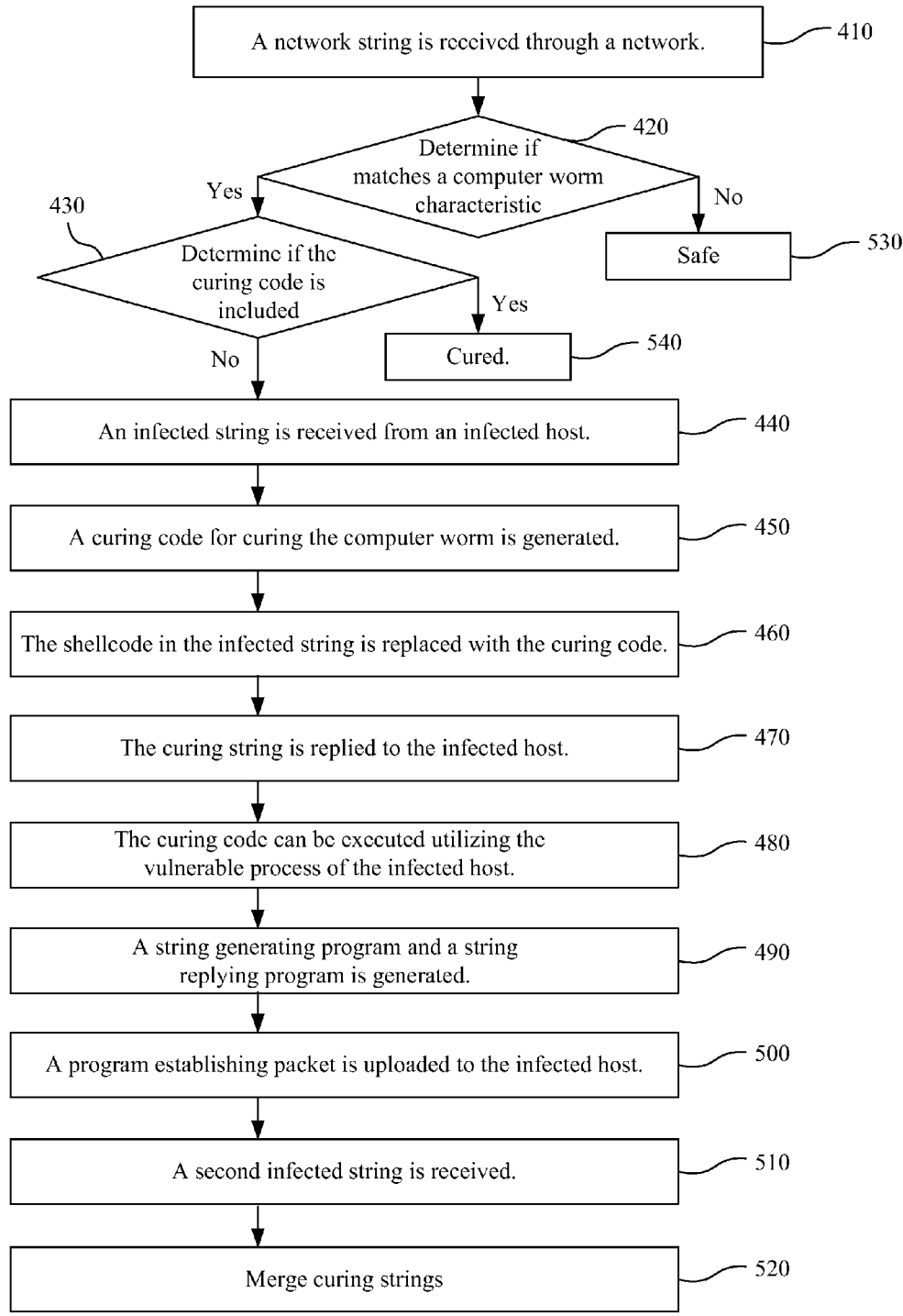
FIG. 2 is a flow diagram of a computer worm curing method according to another embodiment of this invention.

FIG. 2 is a flow diagram of a computer worm curing method according to another embodiment of this invention. In the computer worm curing method, when an infected string is received from an infected host, which is infected by a computer worm, the infected string is changed into a curing string and the curing string is replied to the infected host for curing. The computer worm curing method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EE- PROM) devices; volatile memory such as SRAM, DRAM, and DDR-RAM; optical storage devices such as CD-ROMs and DVD-ROMs; and magnetic storage devices such as hard disk drives and floppy disk drives.

The computer worm curing method 400 includes the following steps:

In step 440, an infected string, which is generated by a computer worm, is received from an infected host, which is infected by the computer worm, through a network. Wherein, the infected string includes a shellcode, the shellcode is executed utilizing a vulnerable process.

In step 450, a curing code for curing the computer worm is generated. Since the infected host is infected by the shellcode of the infected string through the vulnerable process, the curing code can utilize the vulnerable process thereof to cure the infected host.

In step 460, the shellcode in the infected string is replaced with the curing code to generate a curing string. Wherein, the position of the shellcode in the infected string may be detected for the replacement in step 460. Hence, the code at the position of the shellcode in the infected string can be with the curing code to generate the curing string (step 460).

In step 470, the curing string is replied to the infected host. Hence, in step 480, the curing code of the curing string can be executed utilizing the vulnerable process, which is utilized by the shellcode of the infected string for infection, by the infected host to cure the infected host of the computer worm. In one embodiment, the curing code may make the infected host withdraw received strings infected by the same computer worm. In another embodiment, the curing code may make the infected host withdraw strings to be uploaded, which is infected by the same computer worm. In other embodiments, the curing code may utilize other cure methods to cure the infected host of the computer worm, which should not be limited in this disclosure. Therefore, the infected host, which transmits the infected string, can be cured.

Before step 440, if a network string received from a network is infected can be detected. Hence, the computer worm curing method 400 may further include the following steps: a network string is received from a network (step 410). In step 420, determine if the network string matches a computer worm characteristic. Wherein, an Intrusion-detection system may be utilized for the determination in step 420. Besides, the network string can be compared with computer worm characteristics stored in a computer worm characteristic database to determine if the network string matches a computer worm characteristic (step 420).

In step 530, if the network string does not match a computer worm characteristic, the network string is determined safe and not infected. If the network string matches a computer worm characteristic, the network string is taken as the infected string for receiving in step 440.

Besides, the vulnerable process utilized by the curing code of the curing string and that utilized by the shellcode of the infected string are the same, the curing string may be taken as the infected string and cure the hosts again. Hence, the computer worm curing method may further include the following steps: in step 430, determine if the curing code is included in the network string. If the curing code is not included in the network string, the network string is taken as the infected string for receiving in step 440. In step 540, if the curing code is included in the network string, the host, which transmits the network string, is determined cured without generating the curing code or replying the curing string. Therefore, the host would not be cured repeatedly, which can save resources for curing computer worms.

In addition, the infected host can be utilized to cure other infected hosts. Hence, in step 490, a string generating program and a string replying program may be generated. Wherein, the string generating program is utilized for replacing the shellcode in the infected string with the curing code to generate the curing string (step 460). The string replying program is utilized for replying the curing string (step 470). Then, in step 500, a program establishing packet, which includes codes of the string generating program and the string replying program, is uploaded to the infected host. Hence, when the infected host executes the program establishing packet, the infected host can establish the program of replacing the shellcode in the infected string with the curing code to generate the curing string (step 460) and replying the curing string (step 470) to cure other infected hosts. Therefore, the infected host can be not only cured but also utilized to cure other infected hosts.

In addition, the curing code may be utilized to make the infected host transmit a download request to request for the program establishing packet. Hence, the curing code generated by the step 450 may include a download instruction, which makes the infected host transmit a download request. When the infected host executes the download instruction in the curing code through the vulnerable process, the infected host transmits a download request to trigger upload of step 500. Therefore, the infected host can be not only cured but also cure other infected hosts.

Figure 3:
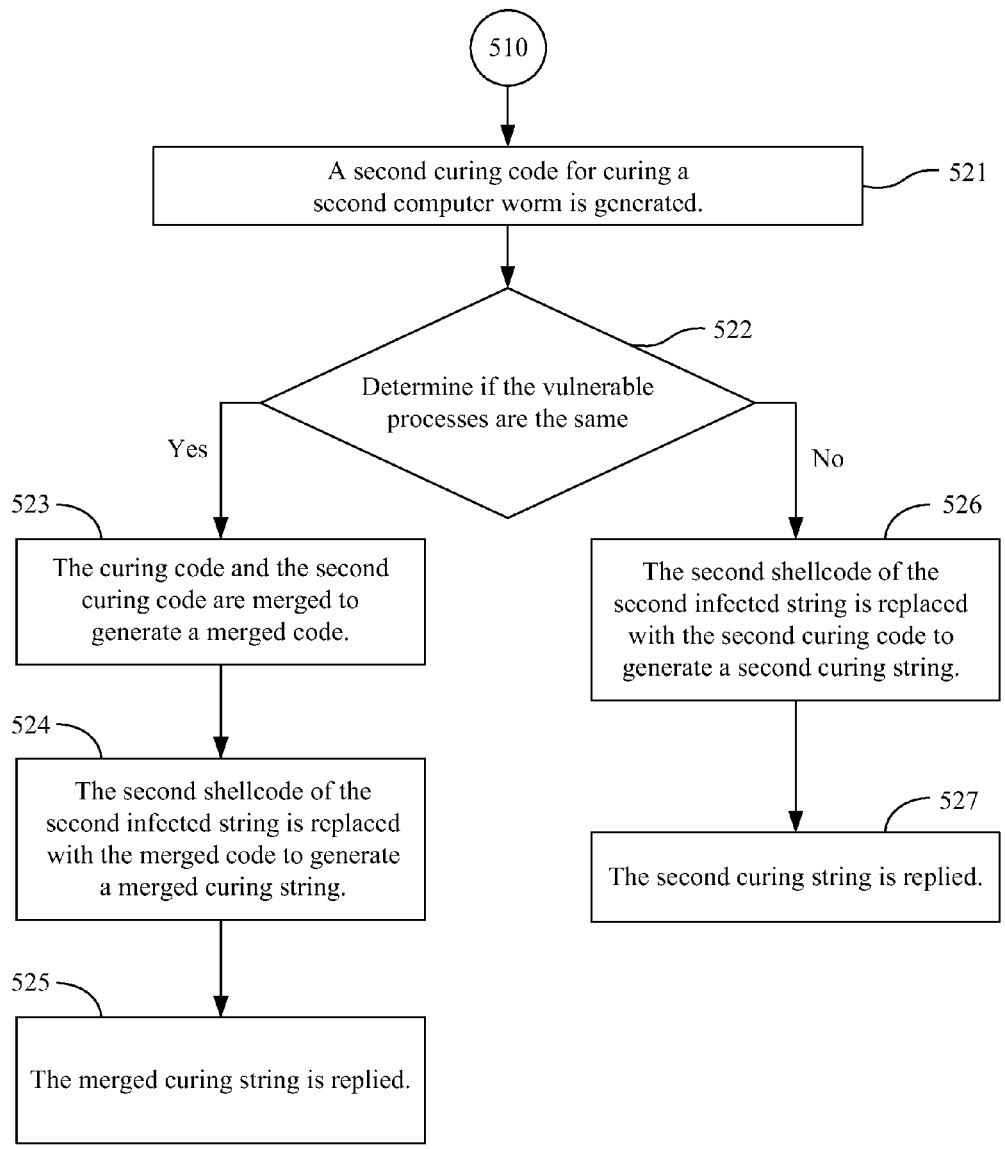
FIG. 3 is an embodiment of merging curing strings (step 520) in FIG. 2.

Curing codes, which utilize the same vulnerable process to cure different computer worms, can be merged into one curing string. Hence, when a second infected string is received (step 510), merge curing strings. FIG. 3 is an embodiment of merging curing strings (step 520) in FIG. 2. The step of merging curing strings may include the following steps:

When a second infected string, which is infected by a second computer worm, is received (step 510), determine if a second vulnerable process, which is utilized by the second shellcode of the second received infected string, is the same with the vulnerable process utilized previously (step 522).

In step 523, if the second vulnerable process is the same with the vulnerable process utilized previously, the curing code and the second curing code, which is generated in step 521, are merged to generate a merged code. Wherein, the merged code can be executed utilizing the same vulnerable process thereof.

In step 524, the second shellcode of the second infected string is replaced with the merged code to generate a merged curing string.

Hence, in step 525, the merged curing string is replied to the infected host to cure several computer worms utilizing the same vulnerable process. Therefore, computer worms, which utilize the same vulnerable process, can be cured by one curing string. Since less curing strings may be needed for curing computer worms, bandwidth for transmitting curing strings can be reduced and resources to execute curing strings for cure can be saved.

In step 526, if the vulnerable processes utilized are different, the second shellcode of the second infected string is replaced with the second curing code to generate a second curing string.

In step 527, the second curing string is replied to cure the second computer worm.

Above all, the infected host, which transmits the infected string, can be cured. Besides, the infected host can be utilized to cure other infected hosts after cured. In addition, the infected host would not be cured repeatedly, which can save resources for curing computer worms. Computer worms, which utilize the same vulnerable process, can be cured by one curing string. Since less curing strings may be needed for curing computer worms, bandwidth for transmitting curing strings can be reduced and resources to execute curing strings for cure can be saved.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A computer worm curing method comprising:
   receiving an infected string, which is generated by a computer worm, from an infected host, which is infected by the computer worm, through a network, wherein the infected string comprises a shellcode, the shellcode is executed utilizing a vulnerable process;
   generating a curing code for curing the computer worm;
   replacing the shellcode in the infected string with the curing code to generate a curing string, such that the curing string is executed utilizing the vulnerable process; and
   replying the curing string to the infected host, such that the curing code of the curing string is executed utilizing the vulnerable process of the infected host to cure the infected host of the computer worm.

2. The computer worm curing method of claim 1 further comprising:
   receiving a network string through the network;
   determining if the network string matches a computer worm characteristic; and
   if the network string matches the computer worm characteristic, determining that the network string is infected and taking the network string as the infected string.

3. The computer worm curing method of claim 1 further comprising:
   receiving a network string through the network;
   determining if the network string matches a computer worm characteristic;
   if the network string does match a computer worm characteristic, determining if the network string comprises the curing code; and
   if the network string comprises the curing code, determining that the infected host, which generates the network string, is cured.

4. The computer worm curing method of claim 1 further comprising:
   generating a string generating program for replacing the shellcode in the infected string with the curing code to generate the curing string;
   generating a string replying program for replying the curing string; and
   uploading a program establishing packet, which comprises codes of the string generating program and the string replying program, to the infected host, such that the infected host can replace the shellcode in the infected string with the curing code to generate the curing string and reply the curing string when executing the program establishing packet.

5. The computer worm curing method of claim 4, wherein the curing code comprises a download instruction, which makes the infected host transmit a download request, and the computer worm curing method further comprises:
   utilizing the vulnerable process to makes the curing code executed by the infected host, such that the infected host transmits the download request when executing the download instruction; and
   starting to upload the program establishing packet to the infected host when the download request is received.

6. The computer worm curing method of claim 1 further comprising:
   receiving a second infected string generated by a second computer worm;
   generating a second curing code for curing the second computer worm;
   determining a second vulnerable process, which is utilized by the second shellcode of the second infected string, is the same with the vulnerable process;
   if the second vulnerable process is the same with the vulnerable process, merging the curing code and the second curing code to generate a merged code; and
   replacing the second shellcode of the second infected string with the merged code to generate a merged curing string, such that the merged code is executed utilizing the vulnerable process.

7. A non-transitory computer readable storage medium with a computer program to execute a computer worm curing method, wherein the computer worm curing method comprises:
   receiving an infected string, which is generated by a computer worm, from an infected host, which is infected by the computer worm, through a network, wherein the infected string comprises a shellcode, the shellcode is executed utilizing a vulnerable process;
   generating a curing code for curing the computer worm;
   replacing the shellcode in the infected string with the curing code to generate a curing string, such that the curing string is executed utilizing the vulnerable process; and
   replying the curing string to the infected host, such that the curing code of the curing string is executed utilizing the vulnerable process of the infected host to cure the infected host of the computer worm.

8. The non-transitory computer readable storage medium of claim 7, wherein the computer worm curing method further comprises:
   receiving a network string through the network;
   determining if the network string matches a computer worm characteristic; and
   if the network string matches the computer worm characteristic, determining that the network string is infected and taking the network string as the infected string.

9. The non-transitory computer readable storage medium of claim 7, wherein the computer worm curing method further comprises:
   receiving a network string through the network;
   determining if the network string matches a computer worm characteristic;
   if the network string does match a computer worm characteristic, determining if the network string comprises the curing code; and
   if the network string comprises the curing code, determining that the infected host, which generates the network string, is cured.

10. The non-transitory computer readable storage medium of claim 7, wherein the computer worm curing method further comprises:

generating a string generating program for replacing the shellcode in the infected string with the curing code to generate the curing string;

generating a string replying program for replying the curing string; and uploading a program establishing packet, which comprises codes of the string generating program and the string replying program, to the infected host, such that the infected host can replace the shellcode in the infected string with the curing code to generate the curing string and reply the curing string when executing the program establishing packet.

11. The non-transitory computer readable storage medium of claim 10, wherein the curing code comprises a download instruction, which makes the infected host transmit a download request, and the computer worm curing method further comprises:

utilizing the vulnerable process to make the curing code executed by the infected host, such that the infected host transmits the download request when executing the download instruction; and starting to upload the program establishing packet to the infected host when the download request is received.

12. The non-transitory computer readable storage medium of claim 7, wherein the computer worm curing method further comprises:

receiving a second infected string generated by a second computer worm;

generating a second curing code for curing the second computer worm;

determining if a second vulnerable process, which is utilized by the second shellcode of the second infected string, is the same with the vulnerable process;

if the second vulnerable process is the same with the vulnerable process, merging the curing code and the second curing code to generate a merged code; and replacing the second shellcode of the second infected string with the merged code to generate a merged curing string, such that the merged code is executed utilizing the vulnerable process.

\* \* \* \* \*